(12) United States Patent
Zysset

(10) Patent No.: US 6,191,511 B1
(45) Date of Patent: Feb. 20, 2001

(54) LIQUID COOLED ASYNCHRONOUS ELECTRIC MACHINE

(75) Inventor: Ernst Zysset, Macolin (CH)

(73) Assignee: The Swatch Group Management Services AG, Biel (CH)

( * ) Notice: Under 35 U.S.C. 154(b), the term of this patent shall be extended for 0 days.

(21) Appl. No.: 09/406,105

(22) Filed: Sep. 27, 1999

(30) Foreign Application Priority Data

Sep. 28, 1998 (EP) .................................................. 98118291

(51) Int. Cl.[7] .............................. H02K 9/00; H02K 7/10; H02K 9/08; H02K 1/32; H02K 9/06
(52) U.S. Cl. ...................... 310/60 A; 310/59; 310/75 D; 310/57; 310/53; 310/54; 310/61; 310/62; 310/63
(58) Field of Search ................................ 310/254, 52, 54, 310/58, 61, 62, 63, 60 A, 60 V, 59, 75 D, 57, 53

(56) References Cited

U.S. PATENT DOCUMENTS

| | | | |
|---|---|---|---|
| 2,706,260 | * | 4/1955 | Heintz ..................................... 310/54 |
| 3,060,335 | * | 10/1962 | Greenwald .............................. 310/54 |
| 3,260,872 | * | 7/1966 | Potter ..................................... 310/54 |
| 3,439,201 | * | 4/1969 | Levy et al. .............................. 310/52 |
| 3,562,564 | * | 2/1971 | Potter ..................................... 310/54 |
| 5,034,644 | * | 7/1991 | Kech ..................................... 310/254 |
| 5,365,133 | * | 11/1994 | Raad ..................................... 310/68 D |
| 5,789,833 | | 8/1998 | Kinoshita et al. ...................... 310/64 |
| 5,818,131 | * | 10/1998 | Zhang ..................................... 310/15 |

FOREIGN PATENT DOCUMENTS

| | | | |
|---|---|---|---|
| 3150724A1 | * | 7/1983 | (DE) . |
| 31 50 724 | | 7/1983 | (DE) . |
| 40 20 416 | | 1/1992 | (DE) . |
| 44 43 427 | | 6/1996 | (DE) . |
| 0 785 612 | | 7/1997 | (EP) . |
| 0 660 492 | | 9/1997 | (EP) . |

* cited by examiner

Primary Examiner—Nestor Ramirez
Assistant Examiner—Guillermo Perez
(74) Attorney, Agent, or Firm—Griffin & Szipl, P.C.

(57) ABSTRACT

In order to assure efficient cooling and a temperature balance between the stator and the rotor, an asynchronous electric motor is provided containing a closed cooling liquid circuit which passes successively into the stator (1) and into the shaft (3) of the rotor, over the entire length of the stator and the rotor. A pump (15) is incorporated in the rotor shaft. The liquid is injected into the pump by a stationary axial tube (16) and comes out again between the shaft and this tube. The pump includes a centrifugal pumping member (20) fixed to the bottom of the bore of the shaft, and longitudinal-blades (21) fixed to the shaft facing an external helicoid rib (17) of the injection tube. The liquid is cooled by the ambient air along the periphery of the stator.

17 Claims, 1 Drawing Sheet

LIQUID COOLED ASYNCHRONOUS ELECTRIC MACHINE

Figure 1:
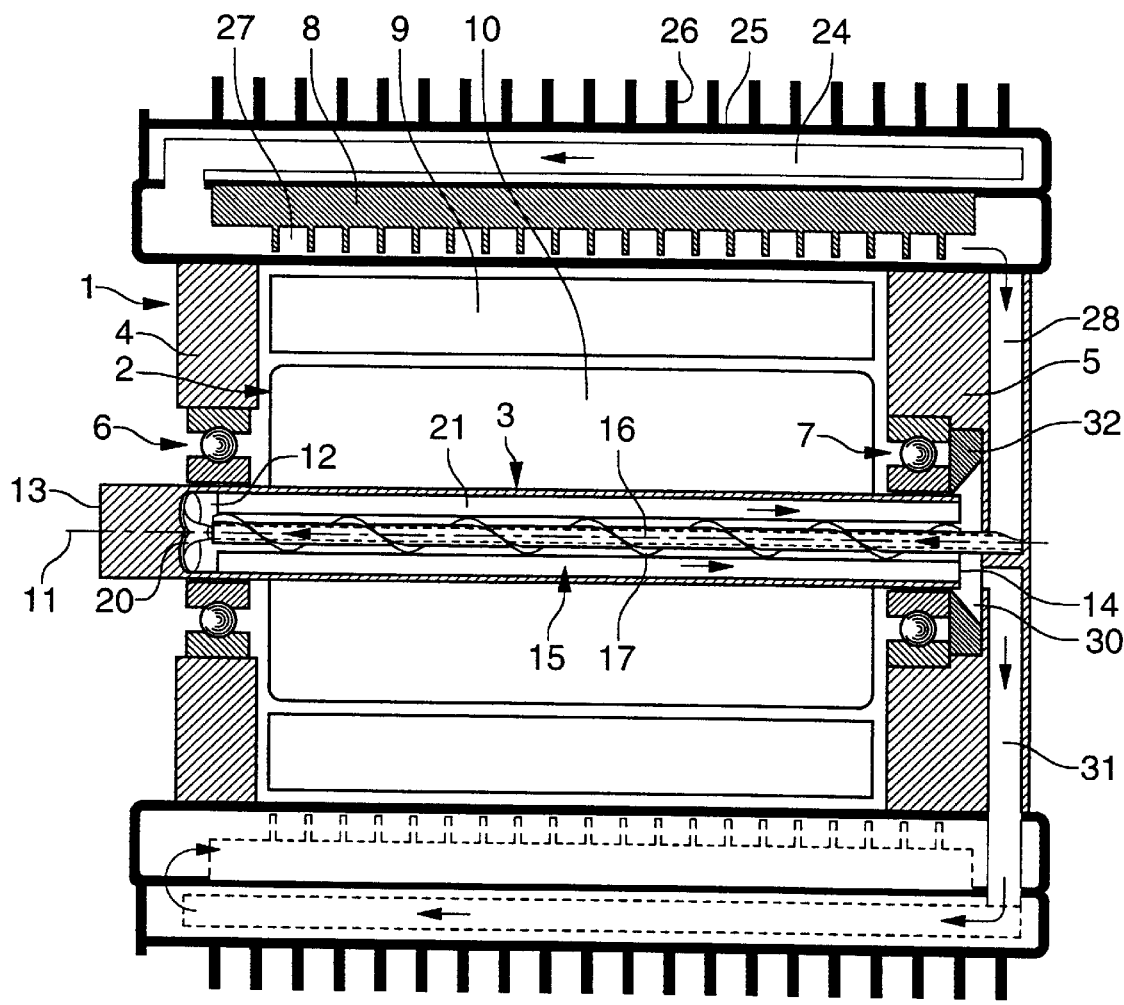

The present invention relates to an asynchronous electric machine, in particular an asynchronous motor, including a rotor within a stator and containing a liquid cooling circuit, the rotor having a hollow shaft in which is incorporated a pump for circulating the liquid.

The invention applies in particular to asynchronous motors for electric traction or hybrid vehicles, these motors having to have a high specific output, be compact and have as few as possible external connectors, in particular for the cooling liquid.

Usually, in motors of this type, the cooling liquid only circulates in the stator, then it is led to an external radiator to be air cooled. This arrangement creates difficulties for the layout of the radiator and the connecting conduits. Moreover, the poorly cooled rotor becomes much hotter than the stator. On the one hand, this increase in temperature forces the designer to limit the supply current, thus the power of the motor, and on the other hand, the difference in temperature between the rotor and stator involves differential expansions which can cause mechanical damage, in particular in the motor bearings.

German Patent Application No. 4020416 describes the incorporation of a pump in a shaft of an electric generator driven by the traction motor of a vehicle. This pump includes a central stationary body with several parallel channels, having a space requirement such that it can only be housed in a shaft of particularly large diameter. The circuit described cools the rotor shaft, but not the stator.

The present invention concerns an asynchronous electric machine, in particular a motor or a generator, whose liquid cooling circuit is arranged so as to avoid to a substantial extent the aforementioned drawbacks.

An asynchronous electric machine according to the invention is therefore characterised in that the liquid circuit is a closed circuit within the machine and passes in the stator and the rotor shaft, substantially over the entire length of the rotor and the entire length of the stator.

One thus obtains a cooling circuit which is completely closed within the motor, requiring neither an external pump, nor connection to an external radiator. The circulation of the liquid successively through the stator and through the rotor guarantees a good temperature balance between these two parts of the motor, thus fewer differential expansions and fewer localised temperature increases, thus allowing a greater specific output and/or a reduction in the motor volume for the same output.

Preferably, the liquid circuit in the stator passes into a cooling chamber where the liquid is in contact with a peripheral casing of the stator, which is provided with outer fins, the circuit then passing into conduits arranged in the support structure of the stator.

This means that the cooling chamber and the peripheral casing of the stator form a water-air heat exchanger, this casing being generally exposed to a strong air current when it is a motor for an electric automobile vehicle, in particular a motor individually coupled to a wheel of the vehicle and situated in the wheel passage.

Figure 2:
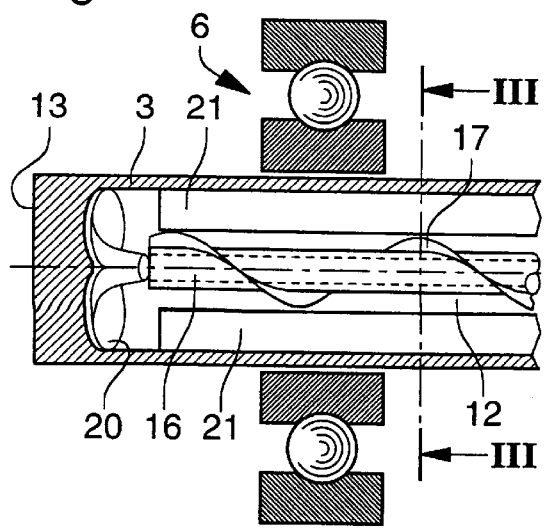
Figure 3:
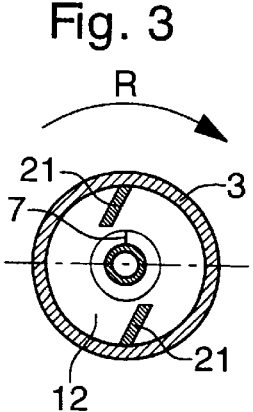
Figure 4:
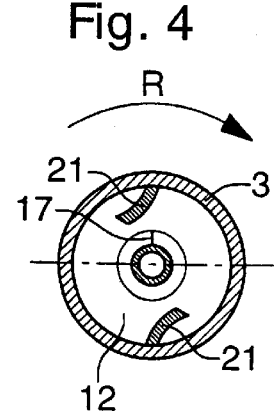

Other features and advantages of the invention will appear in the following description of a preferred embodiment, given by way of non limiting example and with reference to the annexed drawings, in which:

FIG. 1 is a schematic axial cross-section of an asynchronous motor according to the invention, FIG. 2 shows at an enlarged scale a detail of the Figure of FIG. 1, showing a portion of the pump incorporated in the rotor shaft, and FIGS. 3 and 4 are two schematic cross-sections of a portion of the pump, along the line III—III of FIG. 2.

With reference to FIGS. 1 and 2, the asynchronous motor shown includes a stator 1 and a rotor 2 having a hollow shaft 3 which is mounted in flanges 4 and 5 of the stator by means of bearings 6 and 7. The supporting structure of the stator is designated 8, its windings 9, the rotor armature 10 and the axis of rotation of the rotor 11. The central bore 12 of hollow shaft 3 is blind, the shaft being closed at its driving end 13, while it is open at its opposite end 14. Bore 12 extends at least over the entire length of armature 10, and preferably over the entire length of shaft 3 situated within the motor, i.e. also into the zones of bearings 6 and 7.

The motor is cooled as a result of a closed cooling liquid circuit, for example water or oil, including a pump 15 situated in bore 12 of shaft 3. The stationary portion of the pump is formed essentially by a central injection tube 16 which is fixed to stator flange 5 and opens out near to the bottom of bore 12. On its outer surface, this tube is provided with at least one helicoid rib 17, which preferably extends over the entire length of the tube and has a constant height. The tube and its rib can be made of steel or any other suitable material.

The rotating portion of pump 15 includes on the one hand a centrifugal pumping member 20, arranged at the bottom of bore 12 facing the outlet of tube 16, and on the other hand two or more longitudinal blades 21 regularly spaced over the periphery of bore 12 of the shaft, facing helicoid rib 17. A minimum of two blades 21 are provided for reasons of balance, but a higher number can be provided. If required, these blades can also have a helicoid shape.

Pumping member 20 acts as a centrifugal pump impeller. It can be formed either by a suitable relief machined on the bottom of bore 12, or by a pump wheel fixed in said bore. This member 20 sucks in the liquid at the outlet of tube 16 and drives it back between this tube and hollow shaft 3, thus assuring a basic pressure and a good heat exchange between the liquid and the shaft. Next, the axial portion of the pump, including blades 21 and rib 17, generates an additional pumping pressure and blades 21 form additional heat exchange surfaces.

In order to create a sufficient flow rate at slow rotational speeds, the free edge of blades 21 is situated at a small distance from the free edge of helicoid rib 17, as FIG. 3 shows. This guarantees efficient cooling even when the motor rotates slowly.

However, it may happen that the pump consumes too much power when the motor rotates quickly. In a preferred embodiment, this drawback is avoided by the fact that rotating blades 21 can be deformed in such a way that their distance from rib 17 is variable, in particular by bending or flexion of blades 21. This situation is illustrated by FIG. 4.

Such an effect can be obtained in different ways. Blades 21 can simply be able to be deformed transversely by flexion under the effect of the dynamic pressure which they exert on the liquid. Such blades may for example be inserted longitudinally in grooves arranged in shaft 3. In this case, FIG. 3 illustrates the position of blades 21 at rest or at a low speed (in the direction of rotation indicated by arrow R), with a relatively high pumping rate for a low rotational speed. At higher speeds, blades 21 bend as indicated by FIG. 4, so that the flow rate, the hydraulic charge loss and the mechanical power consumed increase slower than with rigid blades.

The position of blades 21 according to FIG. 3 generates a turbulent hydraulic regime which increases the heat exchange between the rotor and the liquid, especially at low speeds where the rotor currents can be particularly strong.

Conversely, the position according to FIG. 4 allows laminar flow, thus a reduction in hydraulic losses at high speeds.

Another solution consists in blades 21 which can be deformed by the effect of temperature, for example blades made of two metal layers having different thermal expansion coefficients. In this case, FIG. 3 shows the high temperature position supplying a relatively high flow rate, and FIG. 4 shows the low temperature position, which consumes less mechanical power. In this solution too, blades 21 can be flexible so as to limit the flow rate at high speeds.

In stator 1, the cooling liquid circuit includes a substantially cylindrical cooling chamber 24, which extends over the entire periphery and length of the stator, along a peripheral metal casing 25, made for example of cast light metal or sheet metal, provided with outer fins 26. Casing 25 thus constitutes a radiator cooled by the ambient air. The liquid circulating in the direction of the arrows then reaches conduits 27 of supporting structure 8 of the stator, to cool the supporting structure and the windings, then it is brought inside injection tube 16 by passing through radial channels 28 of the flange 5 opposite the drive side. The liquid then passing into pump 15 cools shaft 3 and the rotor over its entire length. At the outlet of bore 12 of the shaft, it passes through an annular chamber 30 and radial channels 31 of flange 5 to return to cooling chamber 24. Thus, the cooling liquid circuit comprising liquid chamber 24, conduits 27, channels 28, injection tube 16, bore 12 and radial channels 31 is a closed recirculation loop located entirely within the motor. Only one sealing gasket 32 is necessary between chamber 30 and bearing 7. Channels 28 and 31 of flange 5 can be arranged so as to stimulate circulation of the liquid by convection when the motor is at rest. Those skilled in the art will note that these channels, as well as conduits 27, can be made by foundry techniques and do not create sealing problems, since they are situated entirely within fixed portion of the motor.

The preceding description shows that the invention allows the realisation of an asynchronous motor (and also a generator if required) which is autonomous from the point of view of its cooling, since it requires neither an external pump, nor an external radiator, nor any external fluid conduit. This allows a compact and entirely encapsulated construction, which is particularly suited to the use of the motor in aggressive or explosive environments or on automobile vehicles. In this latter application, the invention offers more freedom for the layout of electric motors and in particular allows hydraulic circuits external to the motor to be omitted, which take up space, cause charge losses and requires, because of the movements of the motor, flexible conduits which are often liable to breakage.

The arrangement of the pump inside the rotor shaft generates a slight axial thrust which stabilises the rotor at all speeds and thus prevents the appearance of vibration in the bearings. Moreover, as the temperature differences between the rotor and the stator are greatly reduced, one can thus also reduce or remove the axial play in the bearings. This allows the construction of the electric generator to be optimised and its service life to be prolonged.

What is claimed is:

1. An asynchronous electric machine comprising:
    a stator having a support structure, first conduit means and a peripheral casing;
    a rotor mounted within said stator and having a hollow shaft;
    a closed cooling circuit passing through said first conduit means and within said hollow shaft, substantially over the entire length of the rotor and the entire length of the stator; and,
    a pump for circulating a liquid in said cooling circuit, said pump being arranged inside the rotor in said hollow shaft;
    wherein said cooling circuit is a closed circuit within the electric motor and includes a radiator comprising a cooling chamber arranged in the stator between said supporting structure and said peripheral casing and where said liquid in contact with said peripheral casing, which is arranged to be cooled by ambient air.

2. A machine according to claim 1, wherein said hollow shaft includes a central bore which is closed on a drive side of the shaft and open on an opposite side, and wherein the cooling circuit includes a stationary injection tube extending axially into said bore and opening out near a bottom of the bore.

3. A machine according to claim 2, wherein said pump includes a centrifugal pumping member arranged at the bottom of the bore of said hollow shaft.

4. A machine according to claim 2, wherein said injection tube is provided with at least one helicoid outer rib.

5. A machine according to claim 4, wherein said pump includes at least two longitudinal or helicoid rotating blades fixed to said hollow shaft in said bore, so as to be able to rotate about the helicoid rib of the injection tube.

6. A machine according to claim 5, wherein said rotating blades are able to be deformed, so that their distance from the helicoid rib is variable.

7. A machine according to claim 6, wherein said rotating blades are able to be deformed by the effect of the dynamic pressure which they exert on the liquid.

8. A machine as claimed in claim 4, wherein said pump further includes a centrifugal pumping member arranged at the bottom of the bore of said hollow shaft.

9. A machine as claimed in claim 5, wherein said pump further includes a centrifugal pumping member arranged at the bottom of the bore of said hollow shaft.

10. A machine according to claim 6, wherein said rotating blades are able to be deformed by the effect of temperature.

11. A machine according to claim 2, wherein the shaft of the rotor includes a central bore which is closed on the drive side of the shaft and open on the opposite side, and wherein the liquid circuit includes a stationary injection tube extending axially into said bore and opening out near the bottom of the bore, and wherein the stator is closed on said opposite side, by a flange containing first channels which connect said bore to said cooling chamber, and second channels which connect said first conduit means of the stator to the injection tube, said injection tube being fixed to said flange.

12. An asynchronous electric machine according to claim 1, wherein said peripheral casing is provided with outer fins.

13. An asynchronous electric machine as claimed in claim 1 wherein said machine is an electric motor.

14. An asynchronous electric machine including:
    a stator;
    a rotor mounted within said stator and having a hollow shaft;
    a closed cooling circuit passing through said stator and within said hollow shaft of said rotor; and,
    a pump for circulating a liquid in said cooling circuit, said pump being arranged inside said rotor in said hollow shaft;
    said hollow shaft including a central bore having a closed bottom on a drive side of said shaft and being open on the opposite side;
    said cooling circuit including a stationary injection tube extending axially into said bore and having an outlet near to said bottom of said bore;

wherein said pump includes a centrifugal pumping member arranged on said bottom of said bore and facing said outlet of said injection tube.

15. An asynchronous electric machine as claimed in claim 14 wherein said machine is an electric motor.

16. An asynchronous motor comprising:

a stator having a support structure, first conduit means and a peripheral casing;

a rotor mounted within said stator and having a hollow shaft;

a closed cooling circuit passing through said first conduit means and within said hollow shaft, substantially over the entire length of the rotor and the entire length of the stator; and, a pump for circulating a liquid in said closed cooling circuit, said pump being arranged inside said rotor in said hollow shaft;

said closed cooling circuit comprising a closed recirculation loop located entirely within said motor.

17. An asynchronous motor as claimed in claim 16 wherein said cooling circuit includes a radiator comprising a cooling chamber arranged in the stator between said support structure and said peripheral casing so that liquid in contact with said peripheral casing is cooled by ambient air.

* * * * *